April 26, 1932. D. B. TOLLEY 1,855,781
ADJUSTABLE CHICK FEEDER
Filed Feb. 24, 1931
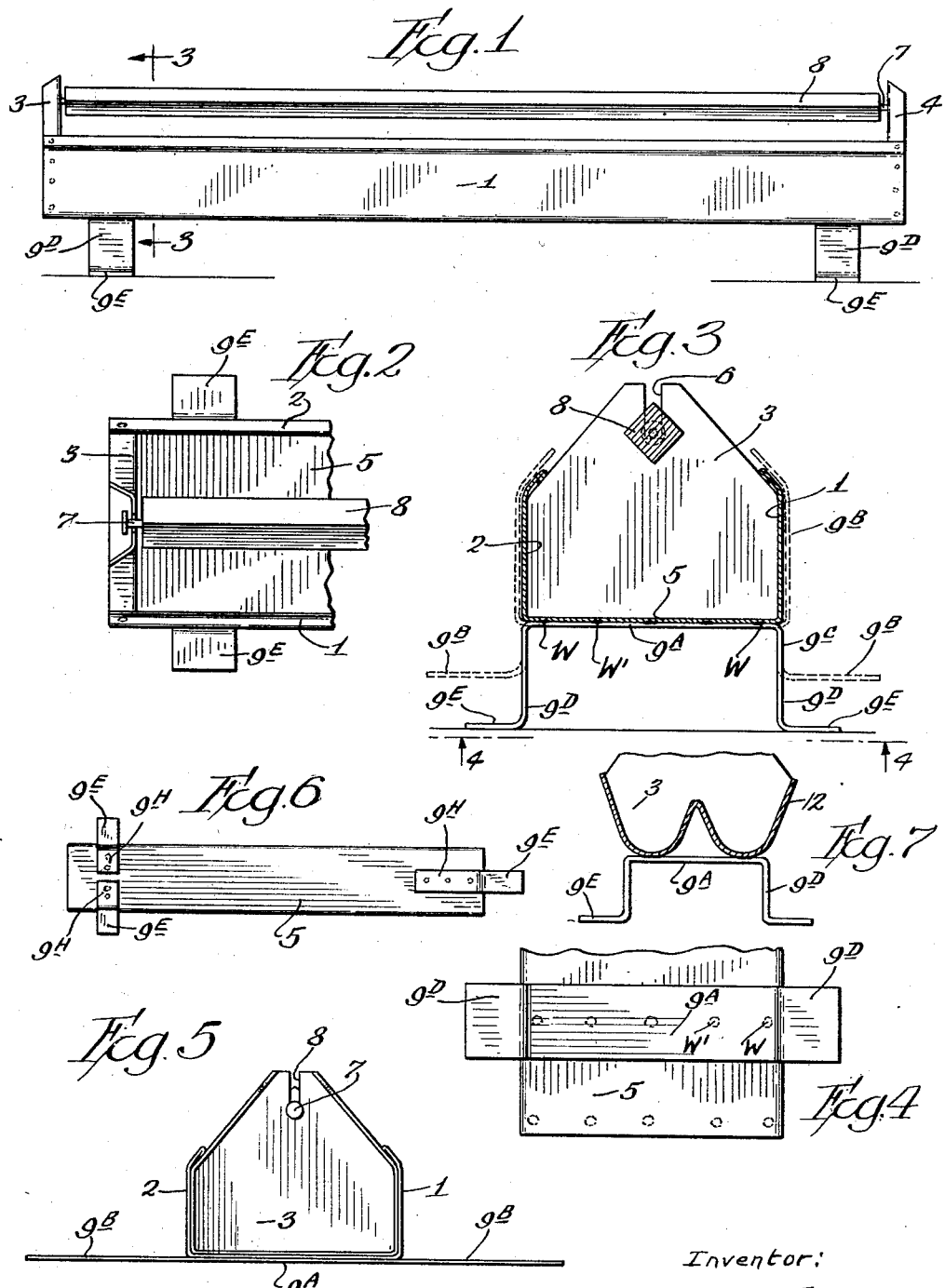
Inventor:
Donald B. Tolley
by Albert Scheible
Attorney Patented Apr. 26, 1932

1,855,781

UNITED STATES PATENT OFFICE

DONALD B. TOLLEY, OF KOKOMO, INDIANA, ASSIGNOR TO GLOBE AMERICAN CORPORATION, OF KOKOMO, INDIANA, A CORPORATION OF INDIANA

ADJUSTABLE CHICK FEEDER

Application filed February 24, 1931. Serial No. 517,699.

My invention relates to chick feeders or drinking troughs, and in its general objects aims to provide a device of this class having cheaply constructed means whereby the pan or trough may be supported at varying elevations without requiring detachable means for securing the supporting means to the feed pan or trough, without requiring the use of tools for readjusting the elevation at which this pan or trough is disposed, and without requiring any considerable amount of packing space for the supporting means.

In the raising of poultry it has long been considered advisable to dispose the pan of a socalled chick feeder at a quite low elevation for accessibility to baby chicks, and to increase the elevation for the older chicks, so as to reduce the extent to which the older chicks will toss litter into the pan when they are scratching for feed. For this purpose, it has heretofore been customary to support the feed trough or other receptacle by means which will permit an adjustment in the elevation of the trough, as for example by providing supporting members on which the trough is vertically slidable, and by clamping the trough to these members by bolts which can be loosened to permit the desired adjustment.

In practice, the use of such bolt-attached supporting members is objectionable in that it adds considerably to the cost of the feeder and requires the use of tools for the adjusting; also because this adjusting is apt to be quite difficult whenever either the bolt shanks or the nuts become rusty, and because the loss of even a single nut may make it impossible to use the feeder. Furthermore, such adjustably attached supporting members usually increase the shipping and storage space required for the feeder, thereby also requiring cartons of a correspondingly larger size and cost.

My present invention aims to overcome all of these objections by providing a feed device of this class with permanently attached supporting members to afford legs of varying heights and also adapted to present these legs close to the pan or trough for compact packing. Moreover, my invention aims to provide an unusually simple and inexpensive arrangement for this purpose, and one in which adjustments in the elevation of the feed receptacle can easily be made manually.

Still further and also more detailed objects will appear from the following specification and from the accompanying drawings, in which Fig. 1 is a side elevation of an adjustable chick feeder embodying my invention.

Fig. 2 is an enlarged plan view of the left-hand end portion of the same feeder.

Fig. 3 is a transverse vertical section, taken along the line 3—3 of Fig. 1 and drawn on a larger scale than Fig. 2, showing the supporting leg members both in positions affording two different elevations of the feed trough and as bent against the trough for compact packing.

Fig. 4 is a bottom view of an end portion of the same feeder, drawn on the same scale as Fig. 3.

Fig. 5 is an end view of the same feeder, taken with the leg members extending horizontally so as to dispose the feed trough close to the floor, and drawn on the same scale as Fig. 2.

Fig. 6 is a bottom view of a three-legged embodiment of my invention, drawn on a smaller scale than the other figures.

Fig. 7 is a fragmentary transverse section of another embodiment of my invention, namely one having a pan affording two parallel troughs.

In the illustrated embodiment of my invention, the feed (or water) receptacle is a sheet metal trough or pan presenting longitudinal sides 1 and 2, and ends 3 and 4. The ends 3 and 4 desirably extend to a greater height above the bottom 5 of the trough than the said sides, and each end is provided at its upper end with an upright slot 6 for journaling a pin 7 which projects from the adjacent end of a horizontal "tumble bar" or guard 8 which will prevent the chicks from climbing or hopping into the trough.

Extending below and transversely of the bottom of the trough (and desirably near each end of the trough) is a supporting strip of metal, generally designated as 9, which strip is considerably longer than the width of the trough bottom 5 and preferably extends for equal distances beyond each side edge of this trough bottom. Each of the strip portions 9 A which underhang the trough bottom is rigidly fastened to the said bottom, as for example by spot-welding the strip to the bottom at the spaced weld portions of Fig. 3, and these fastenings preferably include two fastenings W respectively adjacent to the side edges of the trough and at least one auxiliary fastening W' disposed between the aforesaid fastenings W.

The two supporting strips 9 are preferably of equal length, and each strip is preferably made of a grade of metal which will permit it to be bent digitally, but which is sufficiently stiff to require considerable effort for changing its shape. Moreover, each strip desirably is of a greater length than the sum of the width of the trough bottom and the height of the two trough sides, so that the entire portion of each strip which extends beyond one side of the trough can be bent upwardly adjacent to that trough side (as shown in dotted lines at 9 B in Fig. 3), thereby permitting the entire feeder to be packed in a carton which is only slightly larger in cross-section than either of the trough ends and which corresponds in interior length to the length of the trough.

When the feeder is to be used for baby chicks, each laterally projecting portion 9 B of each supporting strip is bent down from the said upturned position in which this strip portion is disposed when the feeder is packed, so as to extend in alinement with the medial portion 9 A of the strip which is attached to the bottom of the trough. When the feeder is then set upon a floor, its trough is supported by the straightened out strips 9, and the laterally projecting portions 9 B of both strips aid in preventing the trough from being tipped by the usually clumsy baby chicks.

When the chicks have grown to a point where an elevating of the trough will make it easier for them to reach the contents of the trough, each projecting strip portion is bent in counter-part fashion (after the manner shown in dotted lines in Fig. 3) to form a leg 9 C extending downward, and a foot 9 B extending outward from the lower end of this leg. After a further growth of the chicks, each projecting strip portion is rebent to lengthen its leg portion and to shorten its foot portion; so that each such projecting strip portion then constitutes a leg 9 D and a foot 9 E as shown in full lines in Figs. 1 and 3.

Since no tools are required for bending the projecting strip portions in the above described manner, or for thereafter bending these portions back to the starting position of Fig. 5 for use with the next batch of chicks, my invention provides exceedingly simple and expeditious means for adjusting the height of the feed trough to any one of a plurality of different heights, in each of which heights the supporting strips present outwardly extending foot portions which aid in stabilizing the feeder.

The absence of any bolts or other detachable fastening elements and the entire absence of slidably adjustable provisions, such as have heretofore been employed in providing a height adjustment for feeders, considerably reduces the cost of the feeder and the time required for making each desired adjustment, and also eliminates the difficulties which have heretofore been encountered when even a single such auxiliary fastening element became attached by rust to some adjacent part or was lost.

By disposing the outward fastenings W of each supporting strip adjacent to each side edge of the trough bottom, I cause these outward fastening elements to define the approximate line along which the leg portions of the strips are bent downward from the trough-attached strip portion, so that the user can readily space each pair of the formed legs by a distance approximating the width of the trough to secure ample stability; and with readily available material for such strips, these can be rebent so many times for successive batches of chicks that the strip parts will last as long as the usual life of the trough and guard portions of feeders of this class.

However, while I have illustrated and described my invention in an embodiment in which each supporting strip is welded to the bottom of the trough, and which includes two counterpart supporting strips extending transversely of the trough, I do not wish to be limited to these or other details of the construction and arrangement thus disclosed; nor do I wish to be limited to the illustrated shape of the feed receptacle or to its use in connection with feed rather than water, since many changes might be made without departing either from the spirit of my invention or from the appended claims.

For example, it will be obvious that each support strip in the heretofore described embodiment comprises two counterpart longitudinal parts, each of which parts includes both a leg-and-foot-forming portion and a trough-attached portion, these parts being formed integral with each other to cheapen and facilitate the manufacture of the feeder.

However, these two parts of the adjustable support for each end of the trough would also function similarly if they were separately formed and separated attached to the trough, as shown in the left-hand portion of Fig. 6 where the trough-attached strip parts 9 H are spaced from each other.

So also, instead of using bendably adjustable strip parts affording four legs for the trough, I may employ a different number— as shown by the three-legged arrangement in Fig. 6. The cross-sectional shape of the trough or pan is also immaterial, and this may be a twin trough 12 as shown in Fig. 7.

With each of the illustrated embodiments, my feeder can readily have its pan or trough portion disposed close to the floor for easy reach by the baby chicks. Then after the chicks have grown sufficiently to reach a more elevated pan, the latter can readily be raised so as to reduce the tossing of litter into the pan by the chicks when they scratch the ground for feed. The material for the leg members may also be varied, so long as this is sufficiently bendable to permit of changing the effective heights of the legs and also sufficiently strong and rigid for easily carrying the weight imposed on the leg members without altering the bends in these members.

I claim as my invention:

1. A chick feeder or the like comprising a pan and a plurality of leg members secured to spaced portions of the bottom of the pan; each leg member consisting of a flat strip of metal having a pan-attached portion thereof underhanging and secured to the pan and having at least one other portion of the strip extending beyond the adjacent side of the pan; the strip being manually bendable to permit said other portion thereof to be bent to various dispositions, including a disposition in which the said other strip portion extends laterally outward of the pan substantially in the plane of the said pan bottom, and including another disposition in which the said other strip portion presents a leg portion extending downward from the adjacent side of the pan and a foot portion extending horizontally from the lower end of the said leg portion.

2. A chick feeder comprising a pan and a plurality of relatively spaced supporting strips; spaced longitudinally of the pan; each strip including a medial portion underlying and secured to the bottom of the pan, and two extension portions between which the medial portion is interposed; each strip being formed of a grade of metal sufficiently bendable to permit the extension portions thereof to be bent manually to constitute downwardly directed legs terminating in outwardly directed feet, the grade of metal also being such as to offer a considerable resistance to a change of such bends; the medial strip portion being secured to the bottom of the pan at a plurality of points spaced longitudinally of the strip and including two points respectively adjacent to opposite sides of the pan, each of the last named points being spaced by a relatively short distance from the adjacent edge of the pan bottom.

Signed at Kokomo, Indiana, February 18, 1931.

DONALD B. TOLLEY.